UNITED STATES PATENT OFFICE.

CARL LUDWIG VALENTIN ZIMMER, OF BERLIN-WILMERSDORF, GERMANY.

PROCESS OF PRODUCING SYNTHETIC ASPHALT LIMESTONE.

1,237,852.  Specification of Letters Patent.  Patented Aug. 21, 1917.

No Drawing.  Application filed August 11, 1915.  Serial No. 45,024.

*To all whom it may concern:*

Be it known that I, CARL LUDWIG VALENTIN ZIMMER, doctor of philosophy, a subject of the King of Prussia, and a resident of Berlin-Wilmersdorf, Nr. 30/31 Pariserstrasse, Germany, have invented certain new and useful Improvements in Processes for Producing Synthetic Asphalt Limestone, of which the following is a specification.

In making roads of compressed asphalt natural limestone is used, which, on being heated to about 150° C., is decomposed to a brown powder without melting, and this powder, when warm, can be compressed into a solid condition. This property is only peculiar to the natural asphaltic limestone found in Sicily, Raguse, the Abruzzi, Val de Travers, Neuchatel, etc. These natural resources will be exhausted in time, and for this reason endeavors are being made to find an artificial substitute for natural asphaltic limestone. Heretofore however all endeavors have been in vain. The product obtaind by mixing powdered limestone with bitumen in hot condition, is melted when heated, and does not decompose to form a compressible powder like natural asphaltic limestone. Such artificial products are therefore suitable for casting, but not for compression.

Extensive experiments have now resulted in a process for producing synthetic asphaltic limestone, which, when heated, also decomposes to a powder, which, like the natural product, can be compressed into a solid condition and yields roads equal to those made from natural asphaltic limestone.

According to the present process aqueous emulsions of suitable bituminous substances are allowed to act in cold condition on powdered limestone or other powdered stone containing limestone, such as spar, marble, chalk, and the like. Specially suitable for this purpose are natural asphalt, resins, mineral oils and their residues, tar, tar residues and distillates, vegetable and animal oils. The emulsions are preferably prepared by means of sulfonized sebacic acid, animal and vegetable oils and fats, but the process is not restricted to these substances.

In mixing the powdered limestone with the emulsion the limestone causes the emulsion to lose its property as such, the bitumen is taken up by the limestone, and the water is separated in clear condition.

The product obtained decomposes on being heated to about 150–200° without melting and forms a brown powder that can be compressed in warm condition yielding a road material which is equal in quality, goodness, and durability to that produced from natural asphalt limestone.

In carrying out my invention I prefer to pour in a vessel aqueous emulsions of bituminous material, such as asphalt, resins, tars and their residues and distillates, mineral oils and residues, vegetable and animal oils and fats, then I introduce powdered limestone or the like into the liquid contained in the vessel. After a short time the liquid in the vessel is caused to flow down and the stonelike residuum, which at first is somewhat plastic, is dried and heated about 150–200° C.

What I claim and desire to secure by Letters Patent of the United States is:—

1. The described process for producing synthetic asphaltic limestone which consists in causing aqueous emulsions of bituminous material to act in cold condition on powdered limestone, and in heating the product obtained to about 150–200° C.

2. The described process for producing synthetic asphaltic limestone which consists in causing aqueous emulsions of bituminous material to act in cold condition on powdered stone containing lime, and in heating the product obtained to about 150–200° C.

3. The described process for producing synthetic asphaltic limestone which process consists in first pouring in a vessel aqueous emulsions of bituminous material and then delivering powdered limestone or the like into the liquid contained in the vessel, and finally heating the stonelike product to about 150–200° C., substantially as set forth.

Signed at Berlin this 13th day of July 1915.

CARL LUDWIG VALENTIN ZIMMER.

Witnesses:
  WOLDEMAR HAUPT,
  HENRY HASPER.